United States Patent

[11] 3,600,929

| [72] | Inventor | Francis J. Markey<br>Lewisburg, Ohio |
|---|---|---|
| [21] | Appl. No. | 862,811 |
| [22] | Filed | Oct. 1, 1969 |
| [45] | Patented | Aug. 24, 1971 |
| [73] | Assignee | General Motors Corporation<br>Detroit, Mich. |

[54] CONSTANT FLOW LEAK SIMULATOR
1 Claim, 1 Drawing Fig.

[52] U.S. Cl. .................................................. 73/1 R
[51] Int. Cl. ............................................... G01m 3/02,
G01m 19/00
[50] Field of Search ..................................... 73/1 A, 1 B,
49.2, 49.5, 40; 128/218 A, 218 P

[56] References Cited
UNITED STATES PATENTS
1,751,139   3/1930   Feinstein .................. 128/218

3,456,649   7/1969   Jewett ........................ 128/218

Primary Examiner—Louis R. Prince
Assistant Examiner—William A. Henry
Attorneys—W. E. Finken, A. M. Heiter and D. F. Scherer ABSTRACT: A controlled displacement leak simulator for calibrating leak-testing machines. The simulator has a constant speed electric motor driving a rotating drive nut that is supported for rotation between a pair of brackets which prevent linear motion of the drive nut. A drivescrew is threadably connected with the drive nut and is connected through a coupling to a guide member and a piston. The guide member prevents rotation of the drivescrew but permits linear motion thereof. the piston is slidably disposed in a flow chamber such that linear motion of the piston and drivescrew cause fluid to flow from the chamber or permit fluid to flow into the chamber at a controlled rate. A flow port in the chamber is adapted to be connected with the leak test machine which is to be calibrated.

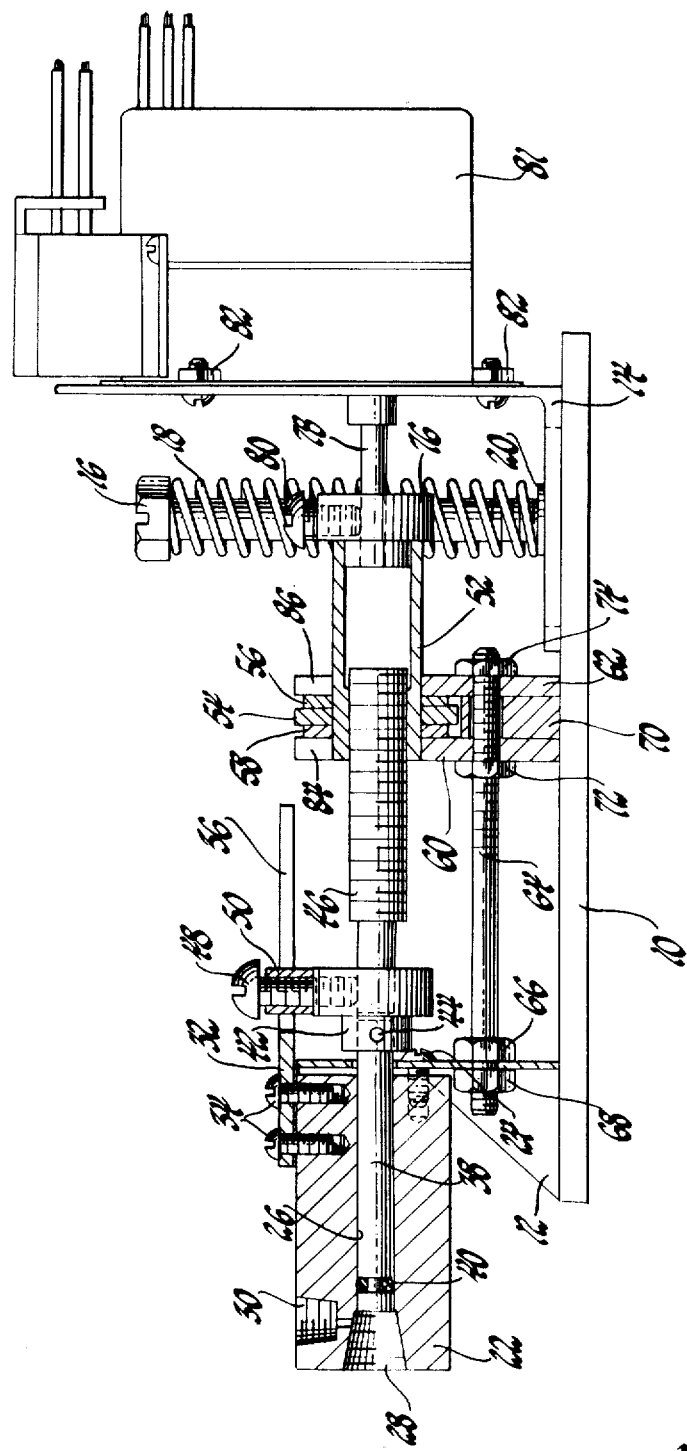

CONSTANT FLOW LEAK SIMULATOR

This invention relates to flow simulators and more particularly to constant rate flow simulators which are used to calibrate testing machines.

Many fluid systems and particularly self-propelled vehicle brake systems require a leak test. This test is performed by a leak-testing machine that normally indicates, by lights, dials, etc., that the system being tested is or is not within acceptable limits. It is therefore necessary to calibrate the leak test machine from time to time to insure the machine is reading correctly within the acceptable limits.

The present invention provides a leak or flow simulator that can be used to calibrate the leak test machines at very small but extremely accurate leakage rates. To accomplish this function, the present invention utilizes a constant low speed electric motor driving a nut and screw drive mechanism in such a manner that the rotary motion of the drive nut is converted to linear motion in the drivescrew. A piston slidably mounted in a bore is secured to the drivescrew and therefore moves linearly with the drivescrew. The motion of the piston in the bore permits fluid to flow into the bore or expels fluid therefrom. The flow rate of the fluid is constant as determined by the speed of the electric motor and the number of threads per inch of the nut and screw drive mechanism. The nut and screw drive mechanism can be easily removed and replaced by a mechanism having a different number of threads per inch thereby changing the flow rate of the leak simulator.

It is therefore an object of this invention to provide in an improved leak simulator, fur use with a leak-testing machine, an expansible chamber including a piston drive linearly by an electric motor through a nut and screw drive mechanism to provide a constant fluid flow rate to or from the chamber to simulate system leakage thereby permitting accurate calibration of the leak test machine.

It is another object of this invention to provide in an improved leak simulator a nut and screw drive mechanism driven by a constant speed rotary electric speed motor and linearly driving a piston in a bore to provide a constant flow rate, and a pair of brackets supporting the drive nut for rotation and providing thrust reaction for the drive nut thereby permitting the rotary motion of the drive nut to be converted to linear motion of the drive screw which is guided in a slot.

These and other objects and advantages will be more apparent to those skilled in the art from the following description and drawing which is an elevational view, partly in section, of the leak simulator.

Referring to the drawing, there is shown a base plate 10 having an upright bracket 12 rigidly secured thereto and a bracket 14 slidably mounted on the base plate 10 and held in a position thereon while a bolt 16 threaded into the base plate 10 and a compression spring 18 held in compression between the head of bolt 16 and a washer 20 abutting the bracket 14.

Bracket 12 has a cylinder housing 22 secured thereto by a plurality of fasteners, such as 24. The cylinder housing 22 has a bore 26 therein which bore has a threaded portion 28 at one end thereof, adapted to receive a fluid fitting. A bleed port 30 is also in fluid communication with the bore 26 and is adapted to bleed air from the system when the leak simulator is being prepared for operation. After the air has been bled from the system, the port 30 can be closed with a plug or be fitted with a valve that can be opened and closed by the operator. A guide member 32 is secured to the cylinder housing 22 by fasteners 34 and has a slot 36 extending along a portion of its length.

A piston 38 is slidably disposed in the bore 26 and has a sealing O ring 40 adjacent one end of the piston 38 to prevent fluid leakage past the piston. The piston 38 extends out of the right end of the bore 26 and is fastened to a coupling 42 by a pin 44. The coupling 42 is also secured to a drivescrew 46 by a threaded fastener 48 which is surrounded by a bushing 50 aligned in the slot 36 of the guide member 32. The drivescrew 46 is threadably engaged with a drive nut 52.

The drive nut 52 has a bearing flange 54 which is sandwiched between a pair of thrust washers 56 and 58 that are held in position against the thrust holder 54 by a pair of brackets or bearing plates 60 and 62. The brackets 60 and 62 are positioned on the base plate 10 by a threaded fastener 64 which is secured to the bracket 12 by a pair of threaded fasteners 66 and 68. The space between the bearing plates 60 and 62 is determined by a bracket plate 70 which is held between the bracket plate 60 and 62 by a pair of threaded fittings 72 and 74 which are threaded onto the fastener 64. The drive nut 52 also has a coupling 76 which permits the drive nuts to be connected to a motor shaft 78 by a screw member 80. The motor shaft 78 is driven by a low speed synchronous-type motor 81 which is mounted on the bracket 14 by fasteners such as 82. The electric motor 81 is a conventional low speed synchronous motor that may rotate at speeds as low as 6 r.p.m.

In operation, the electric motor 81 rotates the drive nut 52 which engages the drivescrew 46. The drivescrew 46 is prevented from rotation by the bushing 50 maintained in the guide slot 36 such that as the drive nut 52 rotates, the drivescrew 46 moves linearly relative to the drive nut. The thrust forces imposed on the drive nut 52 are absorbed by the thrust flange 54 and the thrust washers 56 and 58 and therefore do not place any significant frictional load on the electric drive motor 81. As the drive motor 80 rotates in one direction, the piston 38 is withdrawn from the bore 26 thereby permitting fluid to flow into the bore 46. As the electric motor 81 is rotated in the opposite direction, the piston 38 will be extended into the bore 26 thereby expelling fluid from the bore through the port 28.

The threaded portion 28 of the bore 26 is adapted to receive a conventional fluid fitting and therefore the leak simulator may be placed in fluid communication with a machine to be tested. The machine to be tested or calibrated may be any of the conventional leak-testing equipment commercially available. To calibrate the leak-testing machine, the motor 81 is rotated such that the piston 38 is withdrawn from the bore 26 thereby permitting fluid to flow from the leak-testing machine into the bore 26. The rate of fluid flow into the bore 26 is controlled by the speed of the motor 81 and the number of threads per inch of the drive nut and drive screw 52 and 46. To increase or decrease the flow rate, one of two things can be done. The electric motor 81 can be replaced with one having a different output speed or the drive nut and drivescrew 52 and 46 can be replaced. To replace the drive nut and screw assembly, the fasteners 80 are loosened and the bolt 16 is loosened. With the bolt 16 loosened and the fastener 80 loosened, the motor 81 can be moved to the right thereby disconnecting the shaft 78 from the coupling 76 and since the coupling 42 is loosened by fastener 48, the screw 46 can be rotated by hand to permit it to move into the drive nut 52 and out of the coupling 42. With the drive nut and screw assembly free at both ends, the assembly can be lifted upward out of the brackets 60 and 62 through slot 84 and 86 at the upper end of the brackets 60 and 62. Then a new drive nut and screw assembly having a different number of threads per inch can be placed in the leak simulator to provide a different flow rate.

Obviously many modifications and variations are possible to those skilled in the arts. Therefore, the above description and drawing are only intended as a description of the preferred embodiment and not as limitations of the invention.

What I claim is:

1. A controlled displacement leak test simulator for calibrating a leak test machine comprising a flow chamber; a piston means slidably disposed in said flow chamber for expanding and contracting said chamber; port means adjacent said flow chamber adapted to be connected with the test machine to be calibrated to direct fluid flow to or from the test machine; screw drive means; coupling means for detachably coupling said screw drive means with said piston means; guide means operatively connected with said coupling means for preventing rotary motion and permitting linear motion of said screw drive means; nut drive means threadably drivingly connected with said screw drive means; bracket and bearing means adjacent said nut drive means for permitting rotary movement and preventing linear movement of said nut drive means including a pair of brackets having slots therein to permit selective replacement of said screw and nut drive means; and electric drive means detachably coupled with said nut drive means for driving said nut drive means at a constant speed whereby said piston means will slide in said flow chamber to provide a constant flow rate to or from said chamber.